(12) United States Patent
Phillips et al.

(10) Patent No.: US 6,445,559 B1
(45) Date of Patent: *Sep. 3, 2002

(54) DOUBLE WIDE CENTER HANDLE

(75) Inventors: Norman J. Phillips, Pittsburgh; Paul A. Taylor, Mars; Robert L. Gottardi, Pittsburgh, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,140

(22) Filed: Apr. 25, 2000

(51) Int. Cl.[7] ................................................ H01H 73/00
(52) U.S. Cl. ..................................... 361/115; 361/93.1
(58) Field of Search ............................... 361/115, 93.1, 361/70, 71, 72

(56) References Cited

U.S. PATENT DOCUMENTS 5,319,168 A * 6/1994 Hutko et al. ................. 200/331
6,064,001 A * 5/2000 Ulerich et al. ................ 174/50

* cited by examiner

Primary Examiner—Stephen W. Jackson
(74) Attorney, Agent, or Firm—Martin J. Moran

(57) ABSTRACT

A handle assembly and an alignment member are mounted on a joining structure that fixedly joins a pair of circuit breakers together. A support assembly is mounted in a cassette that removably receives the circuit breakers and joining structure. The support assembly includes a support bar that is moveable between an inward position and an outward position and that provides vertical support to the joining structure and to the circuit breakers to resist sagging of the circuit breakers at the joining structure to facilitate alignment of the circuit breakers with the cassette and installation of the circuit breakers therein. The handle assembly includes a handle that is moveable between a retracted position and an extended position. A horizontal tensile force applied to the handle in the extended position is, in turn, equally applied to each of the circuit breakers to simultaneously disengage the circuit breakers from the stabs on the cassette and to resist the circuit breakers from binding up within the cassette during removal therefrom.

19 Claims, 10 Drawing Sheets

DOUBLE WIDE CENTER HANDLE

BACKGROUND OF THE INVENTION

1. Field of the Invention

The present invention relates generally to circuit breakers and, more particularly, to double-wide circuit breakers that are slidably disposed in a cassette. Specifically, the invention relates to a collapsible handle that is mounted to a pair of circuit breakers that are slidably disposed in a cassette.

2. Description of the Related Art

Numerous types of circuit breakers are known and understood in the relevant art. Among the purposes for which circuit breakers are provided is to interrupt the current flowing through an electrical circuit on command or according to certain criteria. For instance, a given circuit breaker may be configured to interrupt current during one or more specified overcurrent conditions or during other conditions.

Inasmuch as electricity flows through a circuit breaker when the circuit breaker contacts are closed, any given circuit breaker is rated to carry a given maximum current therethrough. Since current requirements can vary from application to application, numerous circuit breakers are provided having different current ratings. While it is desirable to provide different circuit breakers that are suited to different applications having different current requirements, it is undesirable to require that new circuit breakers be designed and manufactured for each new application.

It is thus known to electrically connect a pair of circuit breakers with one another to provide relatively higher "ampacity" or amperage capacity than either of the relatively lower ampacity circuit breakers. In such an arrangement, pairs of the poles of the two circuit breakers are connected in parallel such that a given electrical phase passes through a pair of circuit breaker poles instead of passing through only a single pole.

In such arrangements, the pair of circuit breakers preferably are rigidly connected with one another and may be removably positioned in cassette, with one or more cassettes being mounted in a cabinet. The joined pair of circuit breakers typically is mounted on a pair of extension rails that provide vertical support to the circuit breakers yet permit the circuit breakers to be slidingly and horizontally installed into and removed from the cassette. When the pair of circuit breakers are initially installed into the cassette, the circuit breakers are first placed on the extension rails. The extension rails are then slid rearward into the cassette to enable the quick disconnect members mounted on the conductors at the rear of the circuit breakers to operatively engage a plurality of stabs disposed at the rear of the cassette for electrically connecting the circuit breaker with the line and the load. When it is desired that the circuit breakers be removed from the cassette for maintenance or for other purposes, these circuit breakers are pulled forward away from and are disengaged from the stabs, the circuit breakers resting on the extension rails and sliding thereon during such movement.

While such double-wide circuit breaker configurations have been effective for their intended purposes, such double-wide circuit breaker and cassette configurations have not, however, been without limitation. For instance, depending upon the application, each circuit breaker can be one or two feet wide, or even wider. The combined widths of the joined circuit breakers, as well as any joining blocks or other structures that are interposed between these circuit breakers for the purpose of mechanically fixing them with one another, can easily be two to four feet or more. Such a combined width, along with the weight of the combined circuit breaker assembly which can be on the order of hundreds of pounds, makes the combined circuit breaker assembly extremely difficult for a technician to grasp on alternate ends thereof during installation into and removal from the cassette. The combined width can be such that a technician simply cannot simultaneously grasp the handgrips mounted on each of the extension rails. Such difficulty is particularly exacerbated when it is desired to slide the combined or joined circuit breaker assembly on the extension rails in a forward direction away from the cassette and out of engagement with the stabs.

As is understood in the relevant art, the quick disconnect members mounted on the conductors extending from the rear of the circuit breakers each include a plurality of contact members that are biased into confronting electrical engagement with stabs disposed within the cavity of the cassette. Initial installation of the circuit breakers into the cassette requires a substantial amount of rearward force on the circuit breakers to engage the contact members of the quick disconnect members with the stabs. Likewise, detachment of the contact members from the stabs during removal of the circuit breakers from the cassette requires that a substantial tensile force be applied to the circuit breakers to move the circuit breakers in the forward direction away from the cassette. Application of such a sufficient tensile force can be difficult when the joined circuit breaker assembly is as wide and as heavy as indicated hereinbefore. The need thus exists for a repositioning apparatus for use with draw-out switchgear that can be used to apply a tensile force to a joined circuit breaker assembly to electrically disconnect the joined circuit breaker assembly from a cassette.

It is additionally understood in the relevant art that the joining structure disposed between the circuit breakers functions as a joint between the pair of circuit breakers, with the ends of the circuit breakers opposite the joining structure being supported by the extension rails. The combined weight of the circuit breakers can result in at least nominal sagging at the joining structure, which can interfere with installation and removal of the circuit breakers with respect to the cassette. The need thus exists for a repositioning apparatus that provides support to the circuit breakers and facilitates installation, retention, and removal of the circuit breakers with respect to the cassette.

SUMMARY OF THE INVENTION

In view of the foregoing, a handle assembly and an alignment member are mounted on a joining structure that extends between a pair of circuit breakers, the circuit breakers being removably mounted in a cassette. The joining structure may be a single member or may be two or more joining blocks that securely mount the circuit breakers together. The handle assembly includes a housing that is mounted on the joining structure and a handle that is pivotally mounted on the housing. The handle is moveable between an extended position and a retracted position, and the handle is biased to the retracted position by a pair of springs. The alignment member includes a roller pin that is mounted on the joining structure and a roller that is rotatably mounted on the roller pin. The cassette includes a pair of sidewalls, with each sidewall including an extension rail that is extensibly mounted thereon. The cassette further includes a support bar that is interposed between a pair of guide rails that are mounted on the base of the cassette, the support bar being moveable between an inward position and an outward position with respect to the guide rails. The circuit breakers are mountable in the cassette such that each circuit breaker is mounted on one of the extension rails and the alignment member is rotatably disposed against the support bar. When the circuit breakers are initially installed in the cassette, the circuit breakers are slid on the extension rails in a rearward direction to cause the circuit breakers to electrically engage a plurality of stabs that are internally disposed at the rear of the cassette. When it is desired to remove the circuit breakers from the cassette, a tensile force is applied to the handle to disengage the circuit breakers from the stabs and slide the circuit breakers in a forward direction on the extension rails. The alignment member being disposed against the support bar provides support and alignment to the circuit breakers.

An aspect of the present invention is to provide a circuit breaker assembly, the general nature of which can be stated as including a cassette having a pair of side walls and a pair of extension rails, one of the extension rails being extensibly mounted on one of the side walls, the other of the extension rails being extensibly mounted on the other of the side walls, a pair of circuit breakers, one of the circuit breakers being mounted on one of the extension rails, the other of the circuit breakers being mounted on the other of the extension rails, a joining structure extending between the circuit breakers, and a repositioning apparatus structured to facilitate repositioning of the pair of circuit breakers with respect to the cassette.

Another aspect is to provide a repositioning apparatus structured to facilitate repositioning of a pair of circuit breakers with respect to a cassette, the repositioning apparatus being mountable to a joining structure extending between the pair of circuit breakers, the circuit breakers being removably mounted in the cassette, in which the general nature of the repositioning apparatus can be stated as including a handle assembly, the handle assembly including a handle mountable to the joining structure.

Still another aspect of the present invention is to provide an improvement to a circuit breaker assembly of the type including a pair of circuit breakers, a joining structure disposed between the pair of circuit breakers, each of the circuit breakers being mounted on the joining structure, the pair of circuit breakers and the joining structure being removably disposed in a cassette, the cassette including a base, in which the general nature of the improvement can be stated as including a repositioning apparatus structured to facilitate repositioning of the pair of circuit breakers with respect to the cassette, the repositioning apparatus including a support assembly, the support assembly including a support bar and at least a first guide rail, the at least first guide rail being mounted on the base, the support bar being movable between an inward position and an outward position with respect to the at least first guide rail, the support bar being disposed underneath and supporting the joining structure.

BRIEF DESCRIPTION OF THE DRAWINGS

The preferred embodiment of the invention, illustrative of the best mode in which Applicant has contemplated applying the principles of the invention, is set forth in the following description and is shown in the drawings and is particularly and distinctly pointed out and set forth in the appended Claims.

Similar numerals refer to similar parts throughout the specification.

DETAILED DESCRIPTION OF THE PREFERRED EMBODIMENT

Figure 1:
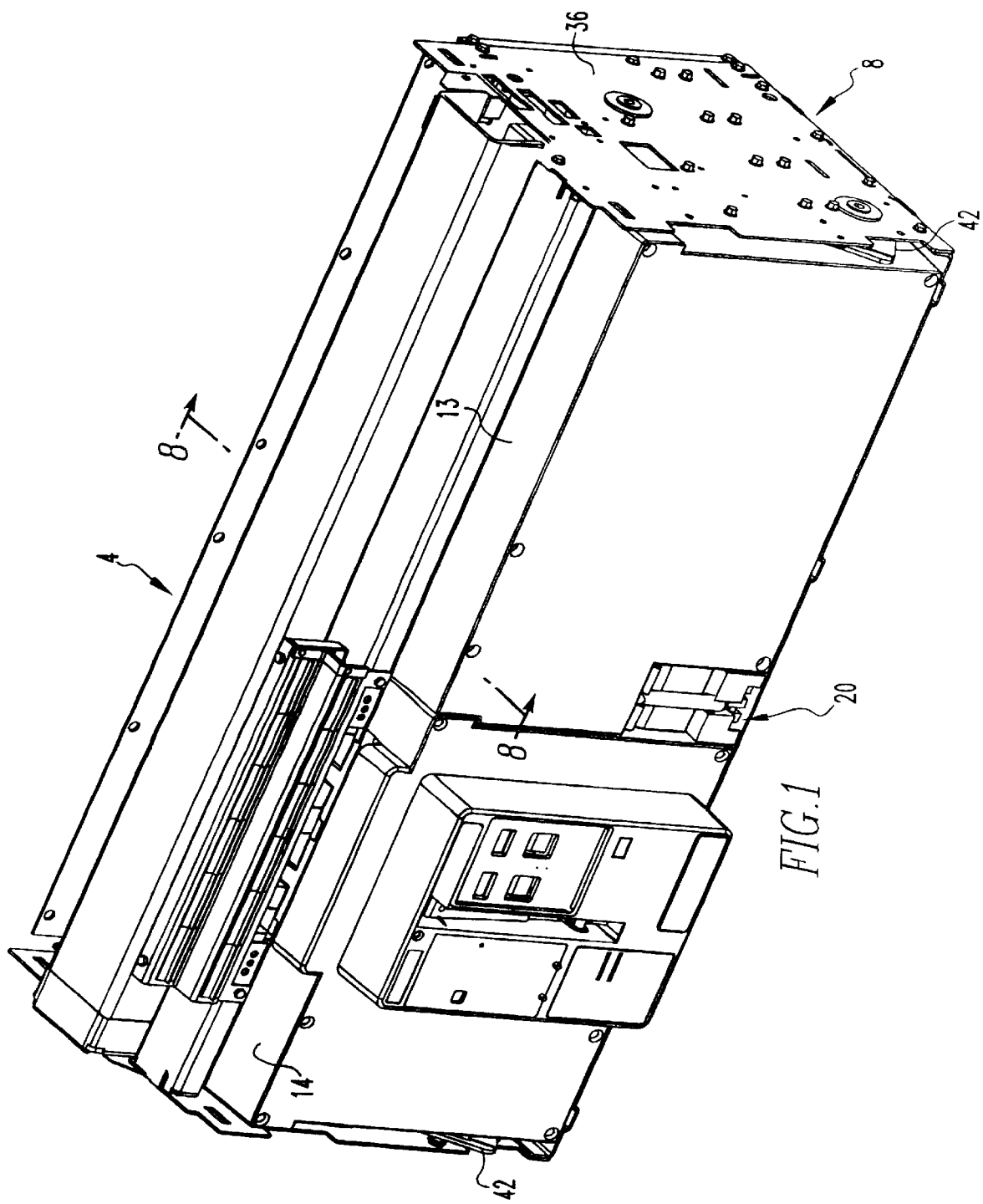
FIG. 1 is a front isometric view of a circuit breaker assembly incorporating a handle assembly, an alignment member, and a support assembly in accordance with the present invention.
Figure 2:
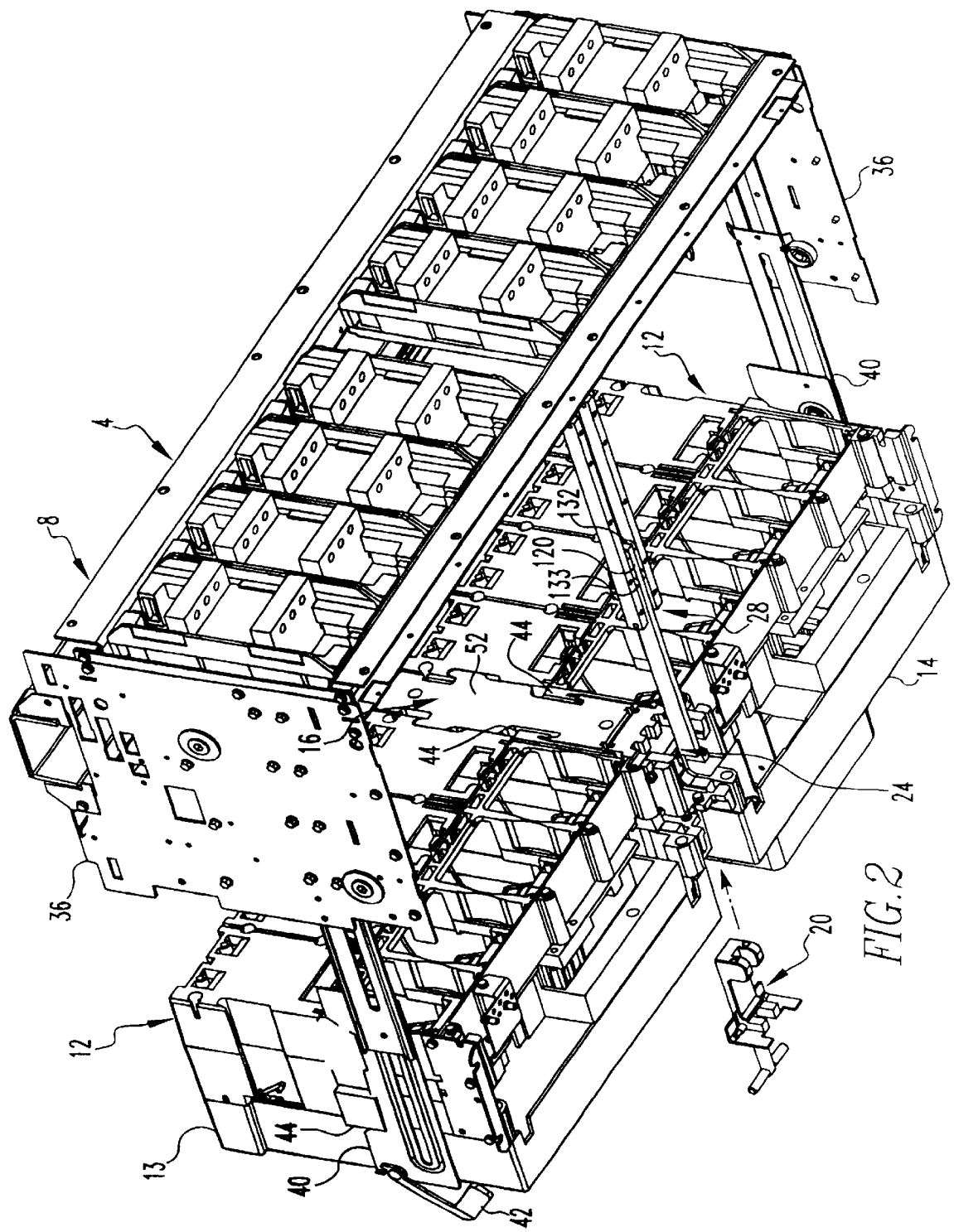
FIG. 2 is an isometric view of the circuit breaker assembly, partially broken away, from the underside thereof and with the base of the cassette removed.
Figure 10:
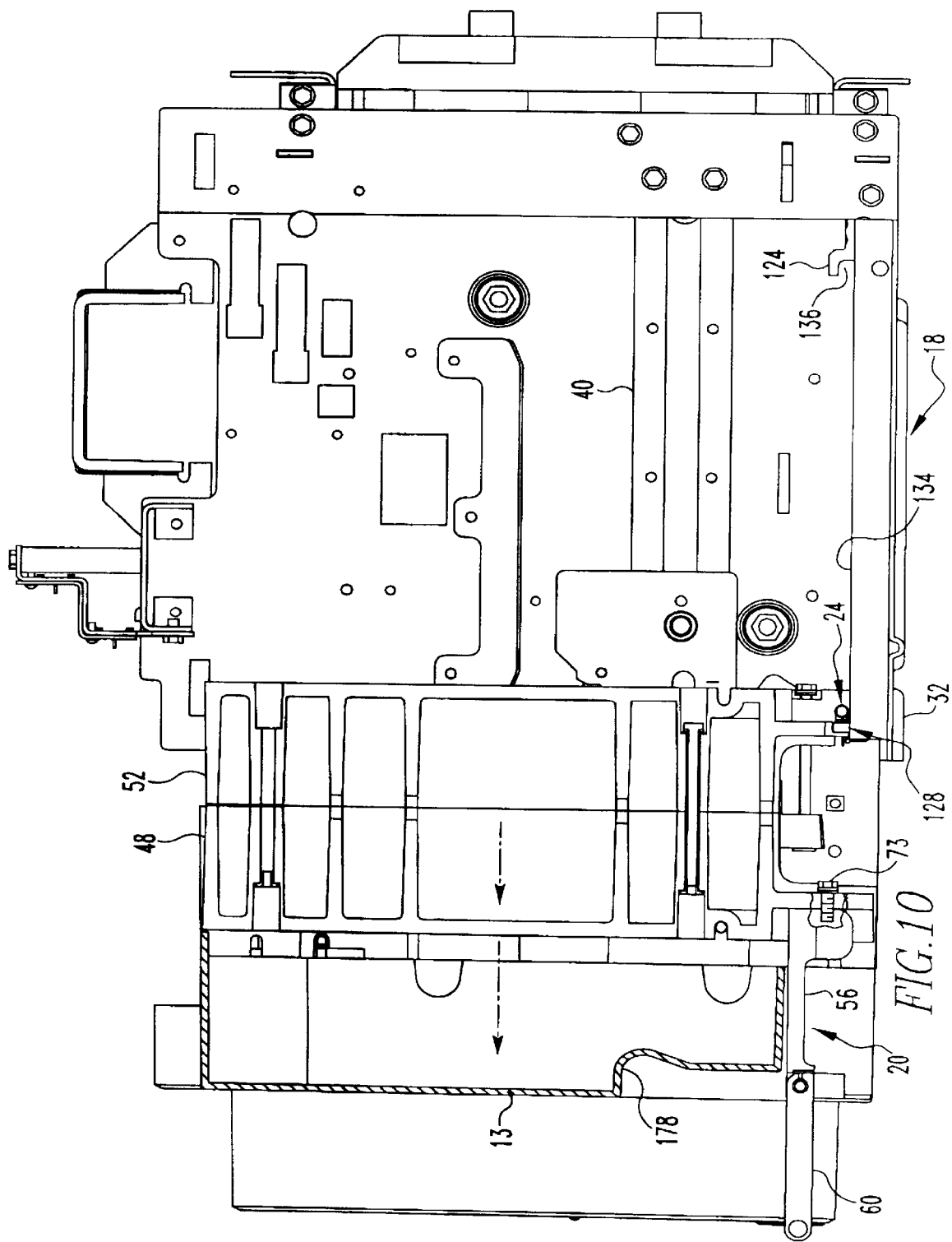
FIG. 10 is a sectional view as taken along line 10—10 of FIG. 9.

The present invention relates to a circuit breaker assembly of the type that may be referred to as "draw-out switchgear." As can be seen in FIGS. 1, 2, and 10, a circuit breaker assembly 4 includes a cassette 8, a pair of circuit breakers 12, a joining structure 16, and a repositioning apparatus 18. The circuit breakers 12 are each fixedly connected to the joining structure 16, with the joined circuit breakers 12 and the joining structure 16 being removably disposed in the cassette 8. The repositioning apparatus 18 advantageously assists and facilitates the installation, retention, and removal of the circuit breakers 12 with respect to the cassette 8.

As is understood in the relevant art, the cassette 8 is mounted within a cell of a cabinet, the cabinet typically including other cells that receive other circuit breaker assemblies, instrumentation, and/or other appropriate devices. The circuit breakers 12 and the joining structure 16 can be selectively removed as a unit from the cassette 8 by employing the repositioning apparatus 18 to draw the circuit breakers 12 and the joining structure 16 out and away from the cassette 8, hence the term "draw-out switchgear."

Figure 7:
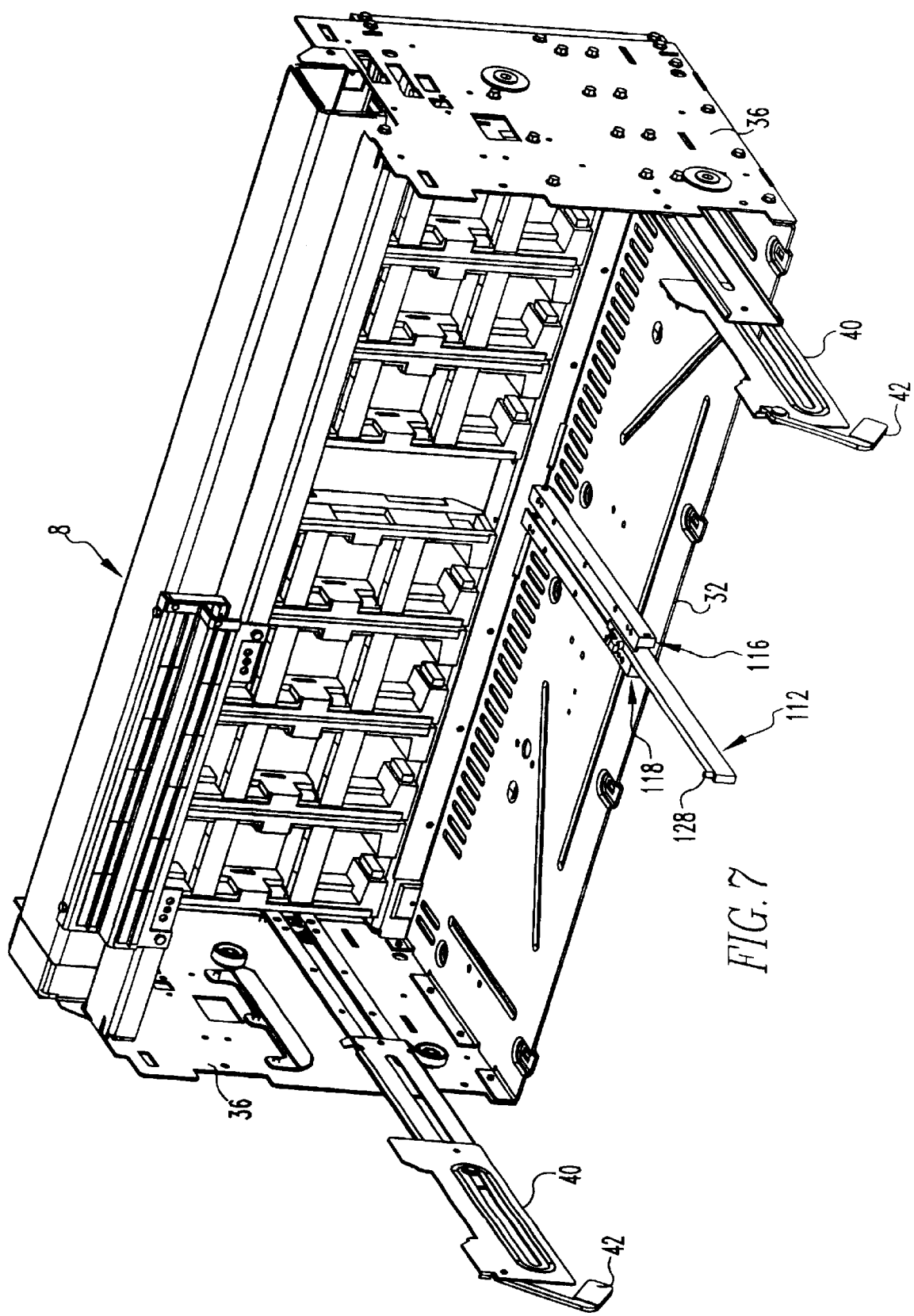
FIG. 7 is an isometric view of the cassette prior to installation of the circuit breakers therein.

In accordance with the present invention, the repositioning apparatus 18 advantageously includes a handle assembly 20, an alignment member 24 (FIGS. 2 and 3), and a support assembly 28 (FIGS. 2 and 7.) The handle assembly 20 and the alignment member 24 are mounted on the joining structure 16, and the support assembly 28 is mounted on the cassette 8, as well be set forth more fully below, although other configurations are possible without departing from the spirit of the present invention.

The circuit beaker 12 may be any of a wide variety of circuit breakers of the type generally known and understood in the relevant art and that include a plurality of poles that are simultaneously tripped under certain specified conditions by a single operating system. The pair of circuit breakers 12 may be of the type that each includes four poles, with all eight of the poles being simultaneously tripped under appropriate conditions by a single rotatable pole shaft that is operatively connected with the operating system. The circuit breakers 12 may also include a first cover 13 mounted on the front of one of the circuit breakers 12 and a second cover 14 mounted on the front of the other circuit breaker 12, the first and second covers 13 and 14 covering and retaining therebehind the crossbar mechanism and other structures of the circuit breakers 12. It is understood that different types of circuit breakers 12 can be used in the manner set forth herein without departing from the spirit of the present invention.

The cassette 8 may be any of a variety of known structures that include a base 32 (FIGS. 6–8 and 10), a pair of sidewalls 36 extending upwardly from alternate sides of the base 32, and a pair of extension rails 40. Each sidewall 36 includes one of the extension rails 40 extensibly mounted thereon (FIG. 7). The circuit breakers 12 are each at least partially mounted on the extension rails 40, with the extension rails 40 being slidable between a protruding position (FIG. 7) in which the circuit breakers 12 can be positioned on or lifted away from the extension rails 40 and a collapsed position (FIG. 1) in which the circuit breakers 12 mounted thereon are operatively connected with a plurality of stabs disposed at the internal rear portion of the cassette 8. The extension rails 40 each include a handgrip 42 at one end thereof and are intended to facilitate the "draw-out" capability of the circuit breakers 12 with respect to the cassette 8.

As is understood in the relevant art, the circuit breakers 12 are preferably of a two-piece molded case configuration manufactured out of an insulative resin, although other configurations can be employed without departing from the spirit of the present invention. The circuit breakers 12 each include a plurality of ears 44 (FIG. 3) that are disposed on the outer surface of the cases thereof and are positioned and configured such that at least one of the ears 44 of each circuit breaker 12 operatively engages and rests upon the upper surface of one of the extension rails 40. The ears 44 opposite those that rest against the extension rails 40 operatively engage the joining structure 16 to enhance the fixed attachment of the circuit breakers 12 with the joining structure 16.

The joining structure 16 itself may be any of a wide variety of structures of the type generally known and understood in the relevant art. As described and depicted herein, the joining structure 16 includes a front joining block 48 and a rear joining block 52, although other configurations for the joining structure 16 are possible without departing from the spirit of the present invention. As is understood in the relevant art, the front and rear joining blocks 48 and 52 each include structures that complementarily receive one or more of the ears 44 of each circuit breakers 12. One or more additional fasteners such as bolts and the like preferably extend between the circuit breakers 12 and the front and rear joining blocks 48 and 52 to fixedly retain the circuit breakers 12 in fixed, substantially rigid relation with one another.

Figure 4A:
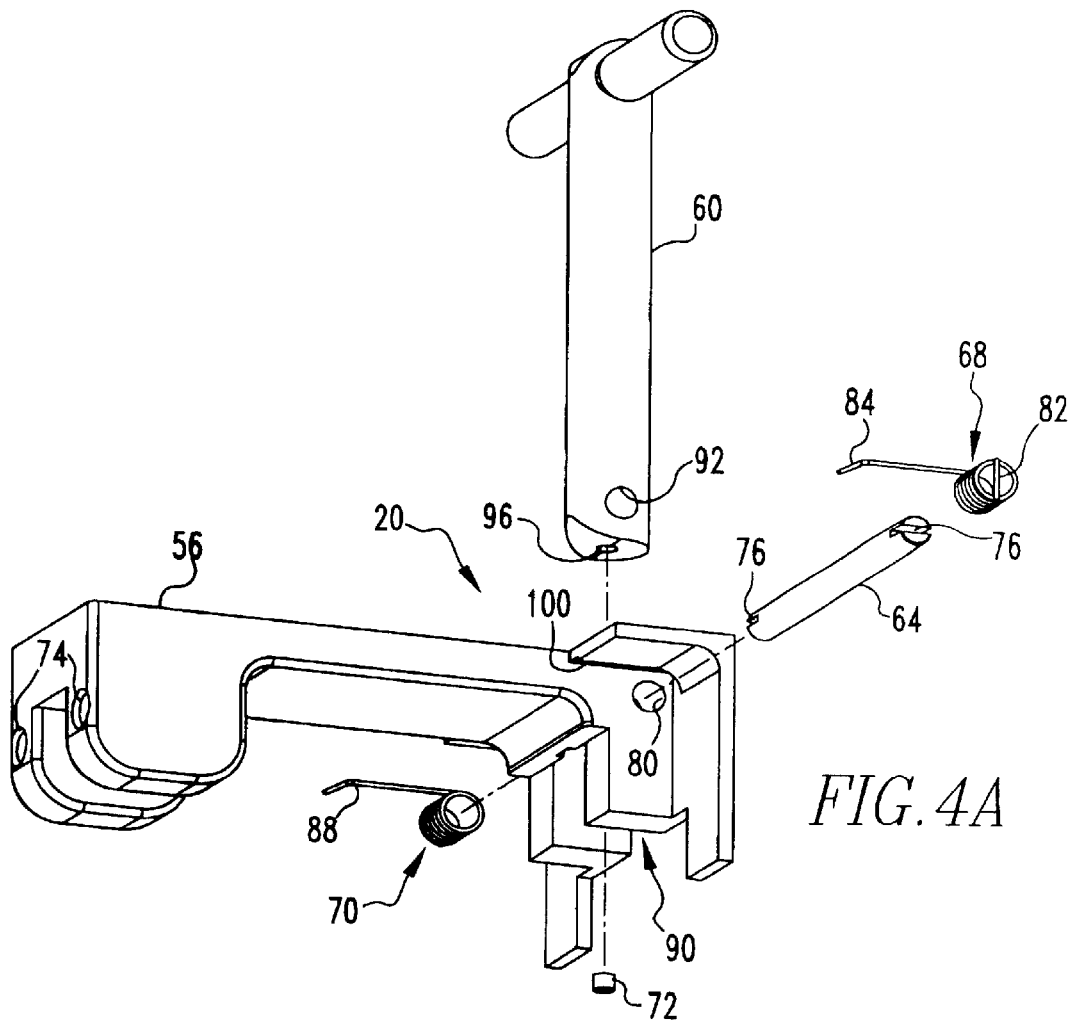
FIG. 4A is an exploded isometric view of the handle assembly.
Figure 4B:
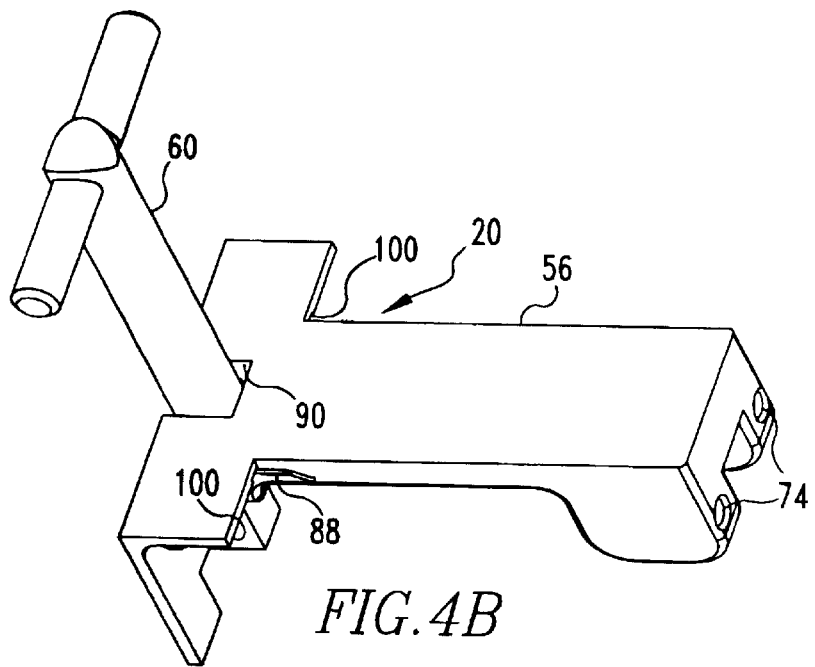
FIG. 4B is an isometric view of the handle assembly.

In accordance with the present invention, and as is shown in FIGS. 4A and 4B, the handle assembly 20 includes a housing 56, a handle 60, a pivot pin 64, a first spring 68, a second spring 70, and a set screw 72. The housing 56 is mounted on a flange on the front joining block 48 with a pair of fasteners 73 (FIG. 10) such as screws or bolts extending through mounting bores 74 formed in the housing 56, although other attachment systems may be used without departing from the spirit of the present invention.

Figure 9:
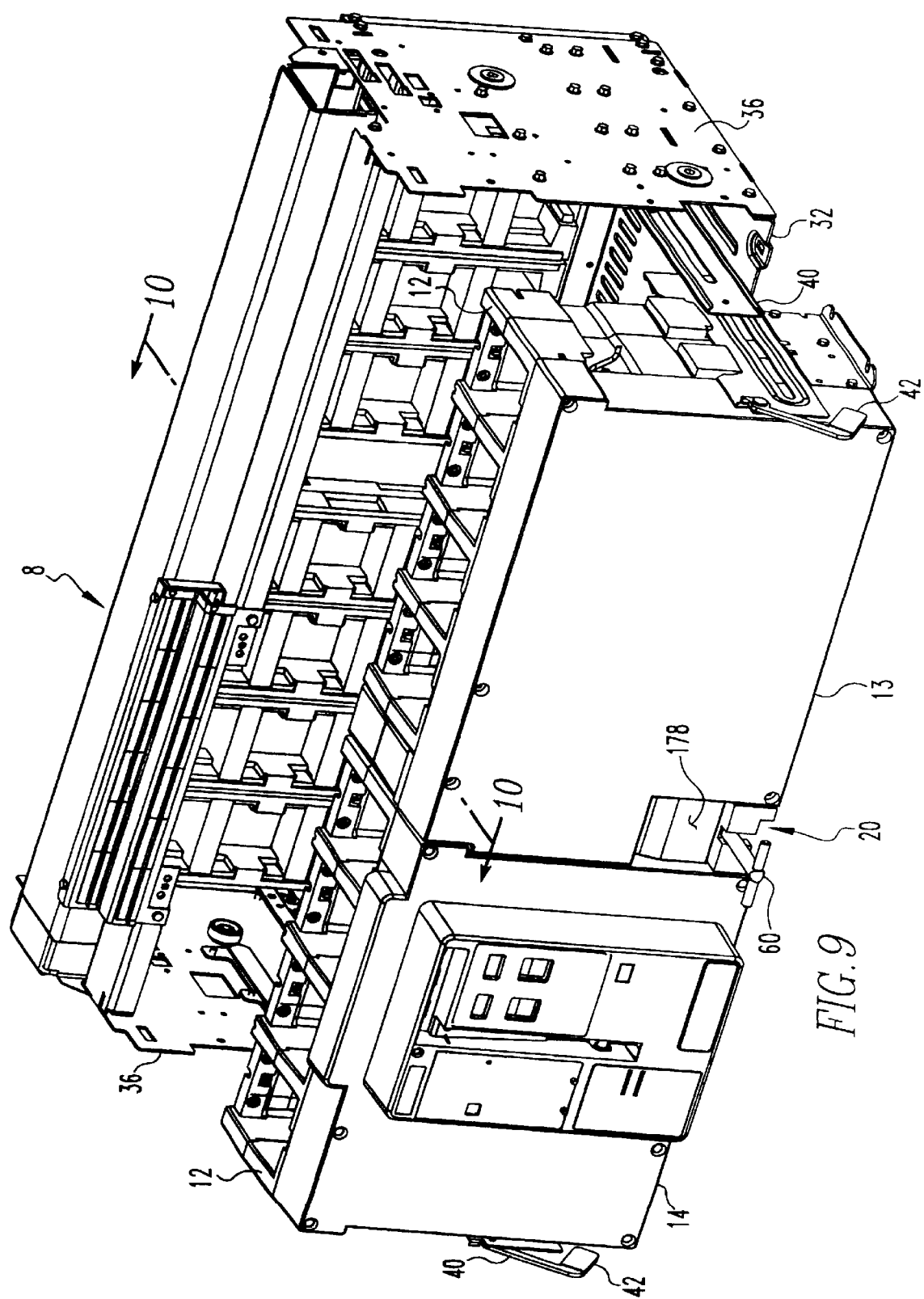
FIG. 9 is a front isometric view of the circuit breaker assembly.

The handle 60 is a generally T-shaped member that is pivotable with respect to the housing 56. The handle 60 is pivotable between an extended position (FIG. 9) and a retracted position (FIG. 1).

The pivot pin 64 is an elongated cylindrical member having a pair of opposed ends, with each end being formed with a rectangular slot 76 extending across the diameter thereof The pivot pin 64 is rotatably disposed in a hollow, substantially cylindrical housing channel 80 formed in the housing 56.

The first and second springs 68 and 70 are each torsion coil springs that bias the handle 60 to the retracted position, as will be set forth more fully below. The first spring 68 includes a first leg 84 extending substantially tangentially away from the arcuate outer surface of the first spring 68. The second spring 70 is of a similar configuration and includes a second leg 88 extending from the outer surface thereof The first and second springs 68 and 70 each include a tab 82 extending across the diameter thereof and are both of a diameter that is sized to accommodate at least a portion of the pivot pin 64 therein. With the ends of the pivot pin 64 received in the first and second springs 68 and 70, the tabs 82 of the first and second springs 68 and 70 are received in the slots 76 of the pivot pin 64.

The housing 56 is formed with an elongated cutout 90 that is of a substantially rectangular cross section and that is sized to receive at least a portion of the handle 60 therein. The cutout 90 is positioned to include a portion of the housing channel 80. One end of the handle 60 is formed with a substantially cylindrical handle channel 92 extending therethrough that is sized to accommodate at least a portion of the pivot pin 64 therein and that is alignable with the housing channel 80 when the handle 60 is at least partially received in the cutout 90.

When the pivot pin 64 is received through both the housing channel 80 and the handle channel 92, the set screw 72 is received in a hole 96 that is formed in the handle 60 and is in communication with the handle channel 92. The set screw 72 preferably is formed with an external thread that cooperates threadably with an internal thread formed on the arcuate surface of the hole 96. The set screw 72 is threadably received in the hole 96 and engages the pivot pin 64 to fixedly retain the handle 60 in fixed relation with the pivot pin 64.

When the pivot pin 64 is received in the housing channel 80 and the handle channel 92, and when the tabs 82 are received in the slots 76, the first and second legs 84 and 88 are received against a pair of retention surfaces 100 on the housing 56. The retention surfaces 100 include small recesses into which the first and second legs 84 and 88 are received to resist the first and second springs 68 and 70 from becoming disengaged from the pivot pin 64. Prior to tightening the set screw 72 against the pivot pin 64, it is preferred that the pivot pin 64 first be rotated to a given torque with the first and second legs 84 and 88 abutting the retention surfaces 100, with the set screw 72 then being tightened with the handle 60 in the retracted position. In so doing, the first and second springs 68 and 70 bias the handle 60 to the retracted position.

Figure 3:
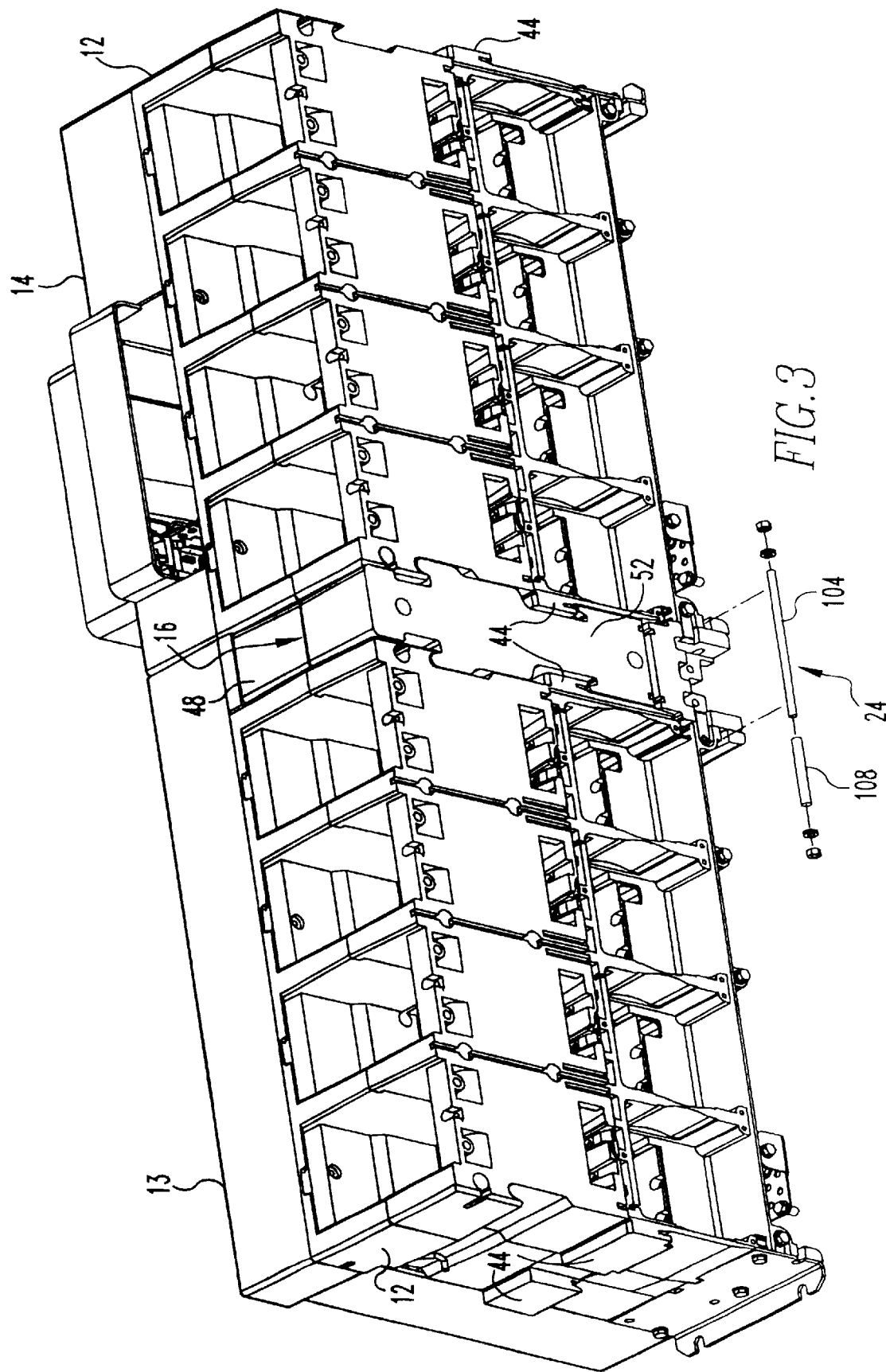
FIG. 3 is an isometric view of the circuit breakers and alignment member, from the rear thereof, with the alignment member broken away therefrom and exploded.

As is best shown in FIG. 3, the alignment member 24 includes a substantially cylindrical roller pin 104 that is fixedly mounted on the rear joining block 52 and a hollow, substantially cylindrical roller 108 that is rotatably disposed upon the roller pin 104. The roller 108 is formed with a substantially cylindrical roller hole extending therethrough that is sized to receive at least a portion of the roller pin 104 therein. The roller pin 104 preferably includes threaded ends that threadably engage with nuts to mount the roller pin 104 on the lower end of the rear joining block 52. The roller 108 is longitudinally retained between the structures of the rear joining block 52 to which the roller pin 104 is mounted. As will be set forth more fully below, the roller 108 is rollably disposed against the support assembly 28 which advantageous provides support to the circuit breakers 12 and aligns the circuit breakers 12 with the stabs during installation of the circuit breakers 12 into the cassette 8.

The support assembly 28 includes a support bar 112, a first guide rail 116, and a second guide rail 118. The first and second guide rails 116 and 118 are fixedly mounted on the base 32 of the cassette 8. The support bar 112 is moveable with respect to the first and second guide rails 116 and 118 between an inward position (FIG. 6) and an outward position (FIG. 7).

The support bar 112 includes a shank 120, a retention tab 124, a post 128, a pair of first wheels 132, and a pair of second wheels 133. The support bar 112 is interposed between the first and second guide rails 116 and 118 and is longitudinally and rollably moveable with respect thereto, as will be set forth more fully below. The first and second guide rails 116 and 118 are spaced apart from one another sufficiently that the shank 120 is longitudinally movable between the first and second lips 148 and 164 with minimal clearance therebetween.

The shank 120 is an elongated member having a substantially rectangular cross section and a generally planar upper surface 134. The retention tab 124 is a generally hook-shaped member that is fixedly mounted on the upper surface 134 with a screw or other appropriate fastener. A portion of the retention tab 124 protrudes upwardly and away from the upper surface 134 of the shank 120 and extends in a direction generally parallel with the longitudinal axis of the shank 120 to provide a socket 136 between the retention tab 124 in the upper surface 134. The socket 136 is sized to receive at least a portion of the roller 108 between at least a portion of the retention tab 124 and the shank 120. It is also understood that alternate structures may be employed to provide the socket 136 atop the shank 120 without departing from the spirit of the present invention.

The post 128 is a substantially cylindrical member protruding upwardly from the upper surface 134 of the shank 120 near the end of the shank 120 opposite the retention tab 124. As will be set forth more fully below, the roller 108 is abuttingly receivable against the post 128 during removal of the circuit breakers 12 from the cassette 8. The post 128 can be of alternate non-circular cross-sections without departing from the spirit of the present invention.

Figure 5:
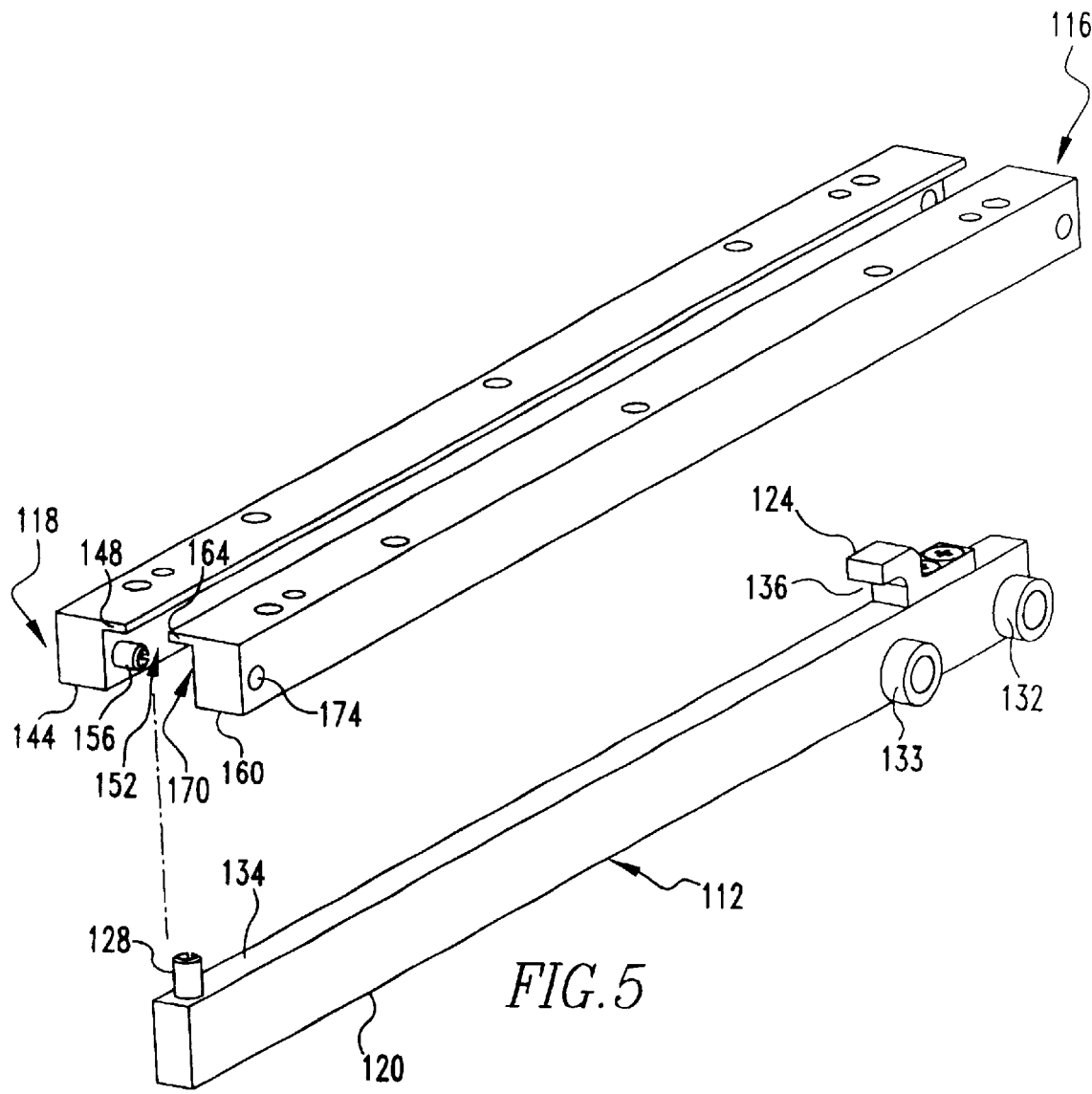
FIG. 5 is an exploded isometric view of the support assembly.
Figure 6:
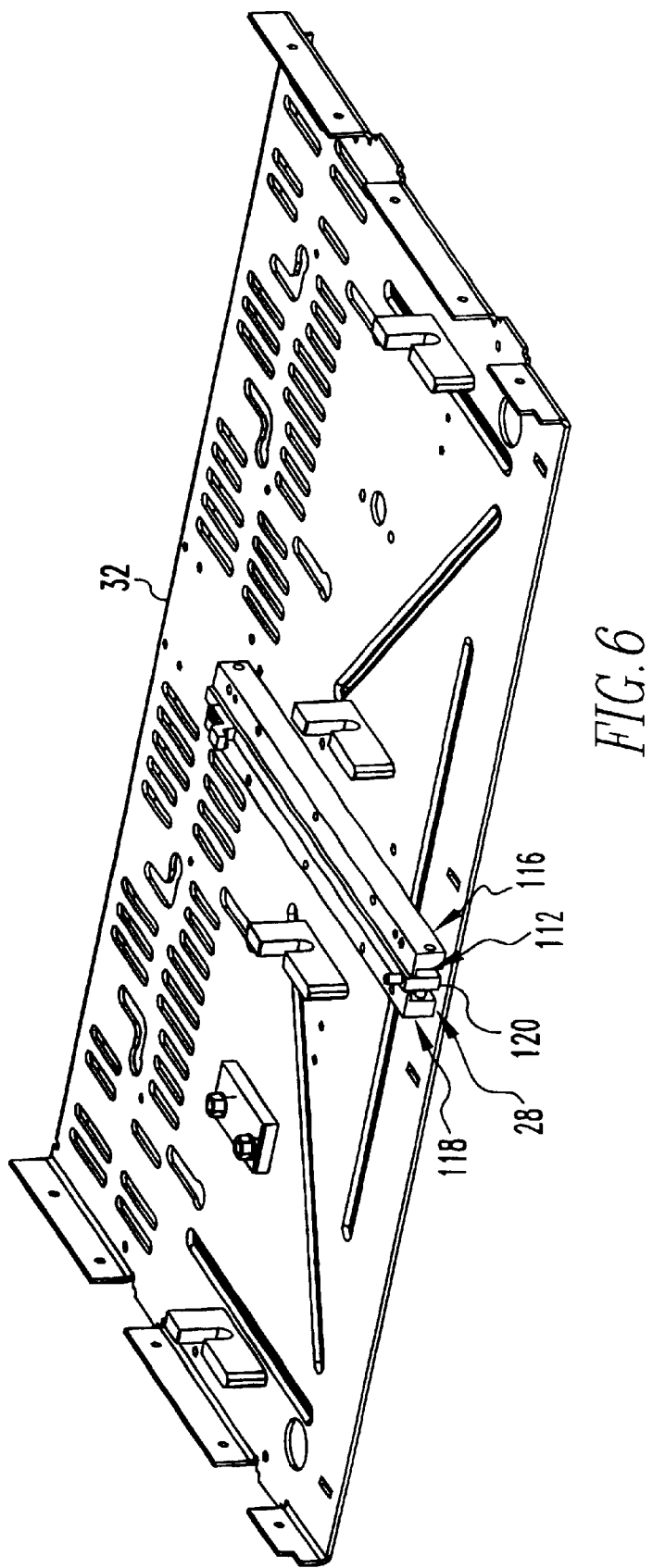
FIG. 6 is an isometric view of the support assembly installed on the base of the cassette.

As is best shown in FIGS. 5–7, the first and second guide rails 116 and 118 are disposed on alternate sides of the support bar 112 and are fixedly mounted on the base 32 of the cassette 8. The first guide rail 116 is an elongated member that includes an elongated first bar 144 of a substantially rectangular cross section and a first lip 148 that is also of a generally rectangular cross section and that protrudes horizontally outwardly from the upper portion of the first bar 144 along the length thereof A first cavity 152 extends between the first bar 144 and the first lip 148 along the length of the first guide rail 116. A first stop pin 156 protrudes horizontally outwardly from one end of the first bar 144 and into the first cavity 152.

The second guide rail 118 is a mirror image of the first guide rail 116 and includes a second bar 160 of a substantially rectangular cross section and a second lip 164 of a substantially rectangular cross section protruding horizontally outwardly from the upper portion of the second bar 160 and extending the length thereof. A second cavity 170 extends between the second bar 160 and the second lip 164 along the length of the second guide rail 118. A second stop pin 174 is mounted in the second bar 160 and protrudes horizontally outwardly therefrom and into the second cavity 170.

As is best shown in FIGS. 2 and 5, the first wheels 132 are disposed on alternate sides of the shank 120 and are axially aligned with one another. Similarly, the second wheels 133 are disposed on alternate sides of the shank 120 and are axially aligned with one another. The first wheels 132 are disposed near the end of the shank 120 that is opposite the end thereof where the post 128 is disposed, and the second wheels 133 are disposed between the first wheels 132 and the post 128. It is preferred that the first and second wheels 132 and 133 are spaced only a relatively short distance from one another and are generally in the vicinity of the retention tab 124.

The axis about which the first wheels 132 rotate is substantially parallel with the axis about which the second wheels 133 rotate. Nevertheless, the second wheels 133 are advantageously arranged such that the outer arcuate surfaces thereof extend at least nominally below the lower surface of the shank 120 opposite the upper surface 134, while the first wheels 132 are not so arranged.

More specifically, the first wheels 132 are configured to be disposed in the first and second cavities 152 and 170 and to be rollably disposed against the undersides of the first and second lips 148 and 164. The arcuate outer surfaces of the first wheels 132 are preferably out of contact with the base 32. Moreover, the second wheels 133 are configured to be disposed in the first and second cavities 152 and 170 and to be rollably disposed against the base 32 and out of contact with the first and second lips 148 and 164. As such, the support bar in the outward position is supported in such a cantilevered condition by the staggered arrangement of the pairs of first and second wheels 132 and 133.

The circuit breakers 12 that are connected with one another by the front and rear joining blocks 48 and 52 are initially installed in the cassette 8 by receiving the outermost ears 44 of the circuit breakers 12 against the upper surfaces of the extension rails 40 in the protruding position. In so doing, the roller 108 is received against the upper surface 134 of the shank 120 with the suppport bar 112 in the outward position (FIG. 2). In this regard, it is preferred that the upper surface 134 is disposed at least nominally higher than the first and second guide rails 116 and 118 to ensure that the roller rolls on the support bar 112 and not on the upper surfaces of the first and second guide rails 116 and 118.

The post 128 is positioned on the upper surface 134 of the shank 120 such that when the support bar 112 is in the outward position and the outermost ears 44 of the circuit breakers 12 are received against the appropriate upper surfaces of the extension rails 40, the roller 108 engages the upper surface 134 at a location between the post 128 and the retention tab 124. In such position, the extension rails 40 provide vertical support to the outermost ends of the circuit breakers 12, and the support bar 112 provides vertical support to the roller 108 and thus the rear joining block 52 and the ears 44 of the circuit breakers 12 that engage the rear joining block 52.

The combined weight of the circuit breakers 12 and the front and rear joining blocks 48 and 52, will, at least in part, be carried by the support bar 112 as applied thereto by the roller 108 that is mounted on the rear joining block 52. With the support bar 112 in the outward position and bearing such weight, the support bar 112 experiences a downward force at the point of application of the roller 108. The staggered arrangement of the first and second wheels 132 and 133 on the shank 120 advantageously retains the support bar 112 substantially aligned with the base 32 and thus helps to support the circuit breakers 12 while still permitting the support bar 112 to rollably move on the first and second wheels 132 and 133 between the inward and outward positions as desired.

With the circuit breakers 12 supported by both the extension rails 40 and the support assembly 28, the circuit breakers 12 are slidingly pushed rearward on the extension rails 40 into the cavity of the cassette 8 to cause the circuit breakers 12 to operatively engage the stabs at the rear of the cassette 8 and to cause the roller 108 to be received in the socket 136. As is understood in the relevant art, the circuit breakers 12 typically are manually pushed rearward to the point that the circuit breakers just touch the stabs, with the circuit breakers 12 then being levered rearward with an appropriate bar or other implement to provide the necessary force to cause the circuit breakers to fully operationally and electrically engage the stabs.

Inasmuch as each circuit breaker 12 is vertically supported both by one of the extension rails 40 and by the rear joining block 52 which is, in turn, supported by the support assembly 28 that is mounted on the base 32 of the cassette 8, sagging of the circuit breakers 12 at the front and rear joining blocks 48 and 52 is advantageously resisted by the support assembly 28. By resisting any sagging of the circuit breakers 12, the support assembly 28 retains the horizontal alignment of the circuit breakers 12 with respect to the cassette 8 to facilitate engagement of the circuit breakers 12 with stabs within the cassette 8.

In the event that the roller 108 rolls along the upper surface 134 of the shank 120 when the circuit breakers 12 are moved rearward into the cassette 8, the retention tab 124 is advantageously provided so that the roller 108 is at least partially received in the socket 136 extending between the retention tab 124 and the upper surface 134. The reception of the roller 108 in the socket 136 prevents the roller 108 from rolling off the end of the shank 120 and ensures that the support bar 112 moves rearward with the circuit breakers 12 when the roller 108 can roll no farther along the upper surface 134. With the roller 108 received in the socket 136, further rearward motion of the circuit breakers 12 into the cassette 8 causes the first and second wheels 132 and 133 to roll along the first and second lips 148 and 164 and base 32, respectively, and to move the support bar 112 from the outward position toward the inward position.

In sliding the circuit breakers 12 rearward and into the cassette 8, the extension rails 40 slidably collapse and carry the circuit breakers 12 rearward. Simultaneously therewith, the roller pin 104 and roller 108 move rearward with the rear joining block 52. During such motion, the roller 108 is rollably disposed against the upper surface 134 of the shank 120, and the first and second wheels 132 and 133 are rollably disposed against the first and second lips 148 and 164 and the base 32, respectively, within the first and second cavities 152 and 170. As such, during the rearward movement of the circuit beakers 12, the roller 108 rolls along the upper surface 134 of the shank 120, the support bar 112 moves rearward by the rolling of the first and second wheels 132 and 133 against the first and second lips 148 and 164 and the base 32, respectively, or there can be a combination of such actions.

When the circuit breakers 12 are fully installed in the cassette 8, the extension rails 40 and the support bar 112 are fully collapsed and retracted to the collapsed and inward positions within the cassette 8. Likewise, the first and second springs 68 and 70 bias the handle 60 to the retracted position. The quick disconnect members are operatively engaged with the stabs and the roller 108 is received in the socket 132.

With the roller received in the socket 132, the upper surface 134 of the shank 120 is advantageously disposed below the roller 108 and the retention tab 124 is advantageously disposed above the roller 108. As such, the roller 108 is retained between the shank 120 and the retention tab 124, with the shank 120 and the retention tab 124 resisting vertical movement of the roller 108, the rear joining block 52, and thus the circuit breakers 12 in the upward and downward directions, respectively. As is understood in the relevant art, the circuit breakers 12 can jarringly jump when tripped, and the configuration of the retention tab 124 on the shank 120 in cooperative engagement with the roller 108 advantageously retains the circuit breakers 12 in a given position and resists vertical movement thereof during tripping or other circumstances.

Figure 8:
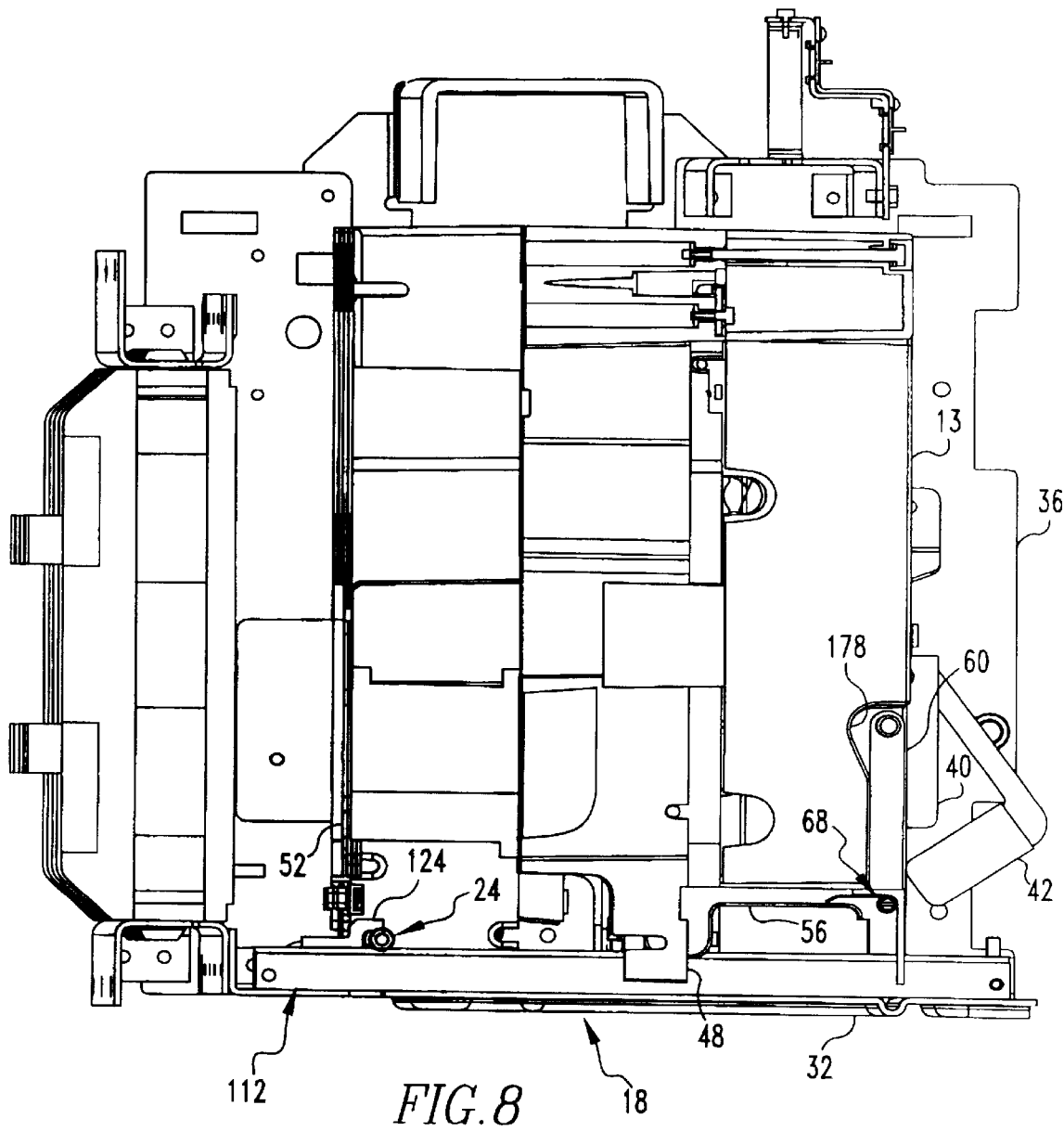
FIG. 8 is a sectional view as taken along line 8—8 of FIG. 1.

As is best shown in FIGS. 1 and 8, the first cover 13 is formed with a recess 178 that receives the handle 60 at least partially therein when the handle 60 is in the retracted position. The recess 178 is sized larger than the handle 60 to permit a technician or other appropriate personnel to reach a hand or an implement into the recess 178 to grasp the handle 60 with minimal difficulty. The handle 60 in the retracted position is at least partially received in the recess 178, such that the handle 60 advantageously does not protrude outwardly beyond the front of the first and second covers 13 and 14. With the handle 60 in the retracted position, the handle 60 cannot readily be used as a stepping surface or platform that might otherwise be used in an unauthorized fashion for climbing up the front of a rack of circuit breakers or for other such unauthorized practices.

Once the handle 60 has been grasped and pivoted out of the recess 178 to the extended position and a tensile force applied thereto, the tensile force is, in turn, applied to the front joining block 48 due to the housing 56 being mounted thereon. The aforementioned tensile force is applied to the front joining block 48 midway between the two circuit breakers 12, and is thus, in turn, advantageously equally applied to each circuit breaker 12 to provide the force needed to disengage the circuit breakers 12 from the stabs disposed at the rear of the cassette 8. In an application wherein each circuit breaker 12 includes four poles, the cassette 8 will include a total of sixteen stabs to engage both of the circuit breakers 12 to the line and to the load. The simultaneous application of an equal force to each circuit breaker 12 resists the disengagement of only one of the circuit breakers 12 from its associated stabs prior to removal of the other circuit breaker 12 from its associated stabs, which advantageously resists the circuit breakers 12 from binding up on the extension rails 40 within the cassette 8.

The application of a single tensile force to the handle 56 to disengage the circuit breakers 12 from the stabs within the cassette 8 also obviates the need for a technician to attempt to grasp the outermost vertical edges of the circuit breakers 12 to apply the horizontal tensile removal force thereto. The handle assembly 20 mounted on the front joining block 48 thus facilitates the removal of the circuit breakers 12 from the cassette 8 by permitting a single application of force to quickly and reliably detach the circuit breakers 12 from the stabs and slide the circuit breakers out of the cassette 8.

When the circuit breakers 12 are being moved out of engagement with the stabs, the roller pin 104 and roller 108 that are mounted on the rear joining block 52 simultaneously move forward with the circuit breakers 12. Again, during such forward movement, the roller 108 can roll along the upper surface 134 of the shank 120, the support bar 112 can move from the inward position to the outward position by the rolling of the first and second wheels 132 and 133 along the first and second lips 148 and 164 and the base 32, respectively, or a combination of both motions may occur. The post 128 protruding upwardly from the upper surface 134 serves as a stop to prevent the roller 108 from rolling off the end of the shank 120 during removal of the circuit breakers 12 from the cassette 8. Once the roller 108 has rolled along the upper surface 134 sufficiently to abuttingly engage the post 128, further movement of the circuit breakers 12 in the forward direction away from the cassette 8 pulls the support bar 112 from the inward position toward the outward position in conjunction with the rolling of the first and second wheels 132 and 133.

Once the circuit breakers 12 have been moved sufficiently away from the cassette 8 to permit their removal from the extension rails 40 and the support assembly 28, the circuit breakers 12, along with the joining structure 16, can be lifted upwardly and removed from the extension rails 40 and the support bar 112 for servicing, replacement, or other appropriate tasks.

The first and second stop pins 156 and 174 are provided on the first and second guide rails 116 and 118, respectively, to prevent the support bar 112 from rolling out of the first and second cavities 152 and 170 whereby the support bar 112 might otherwise fall out of the cassette 8. Inasmuch as the first and second stop pins 156 and 174 protrude from the first and second bars 144 and 160 into the first and second cavities 152 and 170, respectively, the second wheels 133 abuttingly engage the first and second stop pins 156 and 174 which prevent movement of the support bar 112 beyond the outward position. The first and second guide rails 116 and 118 may additionally include optional rear stop pins mounted in the first and second bars 144 and 160 at the end opposite the first and second stop pins 156 and 174 as needed, depending upon the specific configuration of the cassette 8 and the existence of an appropriate alternate rearward stopping structure such as a rear face on the cassette 8. Additionally, the cutout 90 in the housing 56 may be configured with a gap at the lower end thereof to prevent the housing 56 from engaging the post 128 during installation of the circuit breakers 12 within the cassette 8, depending upon the specific configuration of the circuit breakers and of the support assembly 28.

While a particular embodiment of the present invention has been described herein, it is understood that various changes, additions, modifications, and adaptations may be made without departing from the scope of the present invention, as set forth in the following Claims.

What is claimed is:

1. A circuit breaker assembly comprising:
   a cassette having a pair of side walls;
   a pair of extension rails, one of the extension rails being extensibly mounted on one of the side walls, the other of the extension rails being extensibly mounted on the other of the side walls;
   a pair of circuit breakers, one of the circuit breakers being mounted on one of the extension rails, the other of the circuit breakers being mounted on the other of the extension rails;
   a joining structure extending between the circuit breakers; and
   a repositioning apparatus structured to facilitate repositioning of the pair of circuit breakers with respect to the cassette.

2. The circuit breaker assembly as set forth in claim 1, in which the repositioning apparatus includes a handle mounted on the joining structure and at least a first spring, the handle being movable between an extended position and a retracted position, the at least first spring biasing the handle to the retracted position.

3. The circuit breaker assembly as set forth in claim 2, in which at least one of the circuit breakers includes a cover formed with a recess, the recess being sized to at least partially accommodate the handle therein, the handle being at least partially received in the recess when the handle is in the retracted position, the recess being oversized beyond the size required to accommodate the handle.

4. The circuit breaker assembly as set forth in claim 1, in which the repositioning apparatus further includes an alignment member mounted on the joining structure and a support assembly mounted on the cassette, the support assembly structured to support the alignment member.

5. The circuit breaker assembly as set forth in claim 4, in which the alignment member includes a roller rotatably mounted on the joining structure, the roller being rollably supported by the support assembly.

6. The circuit breaker assembly as set forth in claim 4, in which the support assembly includes at least a first guide rail and a support bar, the at least a first guide rail being mounted on the cassette, the support bar being movable with respect to the at least first guide rail between an inward position and an outward position, the alignment member being rollably disposed against the support bar.

7. The circuit breaker assembly as set forth in claim 6, in which the support assembly includes at least a first wheel rotatably mounted on one of the support bar and the at least first guide rail and rollably disposed against the other of the support bar and the at least first guide rail.

8. The circuit breaker assembly as set forth in claim 7, in which the support assembly includes a second wheel, the at least first and second wheels being rotatably mounted on the support bar, the at least first wheel being structured to be rollably disposed against the at least first guide rail, the second wheel being structured to be rollably disposed against the base.

9. A repositioning apparatus structured to facilitate repositioning of a pair of circuit breakers with respect to a cassette, the repositioning apparatus being mountable to a joining structure extending between a pair of circuit breakers, the circuit breakers being removably mounted in the cassette, the repositioning apparatus comprising:
   a handle assembly, the handle assembly including a handle mountable to the joining structure.

10. The repositioning apparatus as set forth in claim 9, in which the handle is movable between an extended position and a retracted position.

11. The repositioning apparatus as set forth in claim 10, in which the handle is pivotable between the extended and retracted positions.

12. The repositioning apparatus as set forth in claim 10, in which the handle assembly further includes a housing, the housing being mountable on the joining structure, the handle being mounted on the housing.

13. The handle assembly as set forth in claim 12, in which the handle assembly further includes at least a first spring, the at least first spring biasing the handle to the retracted position.

14. In a circuit breaker assembly of the type including a pair of circuit breakers, a joining structure disposed between the pair of circuit breakers, each of the circuit breakers being mounted on the joining structure, the pair of circuit breakers and the joining structure being removably disposed in a cassette, the cassette including a base, the improvement comprising:
   a repositioning apparatus structured to facilitate repositioning of the pair of circuit breakers with respect to the cassette, the repositioning apparatus including a support assembly, the support assembly including a support bar and at least a first guide rail, the at least first guide rail being mounted on the base, the support bar being movable between an inward position and an outward position with respect to the at least first guide rail, the support bar being disposed underneath and supporting the joining structure.

15. The circuit breaker assembly as set forth in claim 14, in which the support assembly includes at least a first wheel rotatably mounted on one of the support bar and the at least first guide rail, the at least first wheel being rollably disposed against the other of the support bar and the at least first guide rail.

16. The circuit breaker assembly as set forth in claim 15, in which the support assembly further includes a second wheel, the at least first and second wheels being rotatably disposed on the support bar, the at least first wheel being structured to be rollably disposed against the at least first guide rail, the second wheel being structured to be rollably disposed against the base.

17. The circuit breaker assembly as set forth in claim 14, in which the at least first guide rail is formed with a cavity, the support bar being at least partially disposed in the cavity.

18. The circuit breaker assembly as set forth in claim 14, in which the repositioning apparatus further includes a roller rotatably mounted on the joining structure, the alignment member being supported by the support bar.

19. The circuit breaker as set forth in claim 18, in which the support bar further includes a shank and a retention tab, the roller being removably disposed between the shank and the retention tab, the support being structured to resist upward and downward vertical movement of the roller and of the circuit breakers when the roller is disposed between the shank and the retention tab.

* * * * *